C. G. KISER.
PIPE CONNECTING DEVICE.
APPLICATION FILED OCT. 18, 1916.
1,251,539.
Patented Jan. 1, 1918.
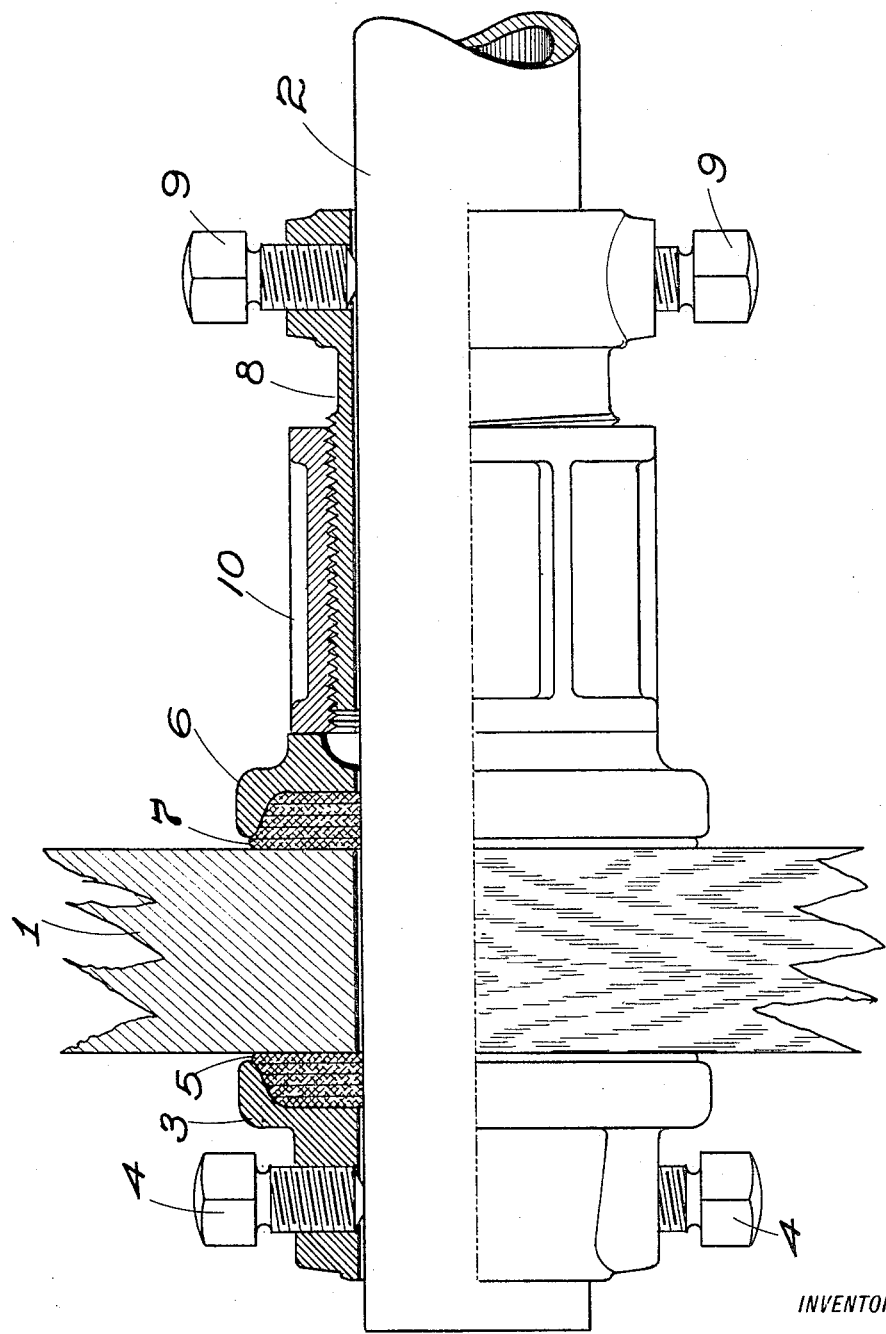
INVENTOR
CURTIN G. KISER
BY
Edward R. Inman
ATTORNEY

UNITED STATES PATENT OFFICE.

CURTIN G. KISER, OF WASHINGTON TOWNSHIP, CLARION COUNTY, PENNSYLVANIA.

PIPE-CONNECTING DEVICE.

1,251,539.     Specification of Letters Patent.     Patented Jan. 1, 1918.

Application filed October 18, 1916. Serial No. 126,428.

*To all whom it may concern:*

Be it known that I, CURTIN G. KISER, a citizen of the United States, residing at Washington township, in the county of Clarion and State of Pennsylvania, have invented certain new and useful Improvements in Pipe-Connecting Devices, of which the following is a specification.

The object, construction and utility of my improved pipe-connecting device for tanks, are herein set forth with sufficient clearness to enable those skilled in the art to which it most nearly relates, to make and use the same.

The object of this invention is to provide a pipe-connection which is especially adapted for use in the oil fields, where it is frequently necessary to make a pipe-connection into a tank which has not previously been prepared for such connection. In such cases, with the use of my improved appliance, such connection may be easily and quickly made, by simply boring or drilling a hole through the wall or side of the tank, which hole is somewhat larger than the outside diameter of the pipe to be inserted therein, then employing my device to make said connection firm and tight.

The construction and application of my improved pipe connection are clearly shown in the drawing which forms a portion of this specification, and which is a side elevation, partially in longitudinal section of said device, showing the same applied to a pipe, which passes through the wall of a wooden tank.

Said construction and application are substantially as follows:

The wall 1 of the tank into which the pipe connection is to be made is first prepared for the reception of said pipe 2 which has a plain or non-threaded periphery, by boring a hole through said wall, through which said pipe may pass freely. To the inner end of said pipe is then secured a flanged collar 3, which is firmly secured to said pipe by means of the set-screws 4, 4: The inner face of the flange of said collar, which is adjacent to said wall 1 of said tank, is preferably recessed or dished somewhat for the reception and retention of a packing substance 5. Upon that portion of the pipe which is outside of and adjacent to said wall 1, is mounted another packing-flange or washer 6 which is free to move longitudinally of said pipe 2. The inner face of said washer 6 is also recessed or dished somewhat for the reception and retention of a packing substance 7.

Upon said pipe 2, in suitable proximity to said flange 6, is rigidly and firmly secured an externally screw-threaded sleeve 8, which is secured to said pipe by means of the set-screws, 9, 9: Upon said sleeve is mounted a coöperating, internally-threaded collar 10, which is arranged with the inner end thereof in contact with the adjacent face of said flange 6.

By turning said collar 10 so that said screw-thread will cause it to move in the direction of said flange 6, or, on the other hand, cause said pipe 2 to move in the opposite direction, or, as may be the case, cause both of said movements to take place, whereby said flanges 3 and 6 will be caused to move toward each other, the packing substances 5 and 7 will thus be compressed firmly about the wall of said pipe and against their respective sides of the wall 1, so that a fluid-tight joint around said pipe will be formed.

While the drawing shows my pipe-connecting device in use with a wooden tank, its use is equally applicable to a sheet iron or steel tank, since the thickness of the wall of the tank is immaterial and does not in any way limit or determine the applicability of said device.

The packing substances 5 and 7 may be any suitable material, such as vegetable fiber, rubber, heavy clay, cement, etc.

The jack member of my device, which comprises the sleeve 8 and collar 10 may be considerably modified in several respects without departing from the scope of my inventive idea.

Having thus fully described my invention, what I claim and desire to secure by Letters Patent is:

1. A pipe-connecting device, comprising in combination, a pipe having a plain periphery, a flange adapted to be rigidly mounted upon said pipe, an additional flange adapted to be loosely mounted upon said pipe and movable longitudinally thereof, and means adapted to cause said flanges to exert, coöperatively, a clamping action between the adjacent faces thereof.

2. A pipe-connecting device comprising in combination, a pipe having a plain periphery, a flange rigidly secured to said pipe, an additional flange arranged in juxtaposition to said first-mentioned flange, the opposing faces of said flanges being adapted to coöperatively exert a clamping action between them, and a jack rigidly secured to said pipe adapted and operable to cause said clamping action.

3. A pipe-connecting device comprising in combination, a pipe having a plain periphery, a wall through which said pipe is loosely inserted, a flange rigidly mounted upon said pipe with one face thereof in juxtaposition to said wall, a packing substance interposed between said face and said wall, an additional flange loosely mounted upon said pipe and positioned upon the opposite side of said wall from said other flange, one face of said flange being in juxtaposition to said wall, a packing substance interposed between said last-mentioned face and said wall, and a jack mounted upon and rigidly secured to said pipe operable to actuate said flanges into firm contact with their respective sides of said wall.

In testimony whereof I affix my signature in presence of two witnesses.

CURTIN G. KISER.

Witnesses:
E. R. INMAN,
LAURA S. INMAN.